US005728302A

United States Patent [19]
Connor et al.

[11] Patent Number: 5,728,302
[45] Date of Patent: *Mar. 17, 1998

[54] METHODS FOR THE REMOVAL OF CONTAMINANTS FROM SUBTERRANEAN FLUIDS

[75] Inventors: John A. Connor; Dennis A. Clifford, both of Houston, Tex.; Philip T. King, Anchorage, Ak.

[73] Assignee: Groundwater Services, Inc., Houston, Tex.

[*] Notice: The term of this patent shall not extend beyond the expiration date of Pat. No. 5,196,124.

[21] Appl. No.: 655,305

[22] Filed: May 20, 1996

Related U.S. Application Data

[63] Continuation of Ser. No. 257,110, Jun. 8, 1994, abandoned, which is a continuation-in-part of Ser. No. 28,951, Mar. 10, 1993, abandoned, which is a continuation-in-part of Ser. No. 866,341, Apr. 9, 1992, Pat. No. 5,196,124.

[51] Int. Cl.$^6$ .................... B01D 15/04; C02F 1/42
[52] U.S. Cl. .................. 210/679; 210/682; 210/683; 210/717; 210/747
[58] Field of Search ................ 210/679, 681–683, 210/691, 692, 694, 695, 717, 747, 502.1

[56] References Cited

U.S. PATENT DOCUMENTS

| | | | |
|---|---|---|---|
| 2,642,514 | 6/1953 | Herkenhoff | 210/695 |
| 3,094,846 | 6/1963 | Peeler. | |
| 3,136,715 | 6/1964 | Ames et al. | 210/51 |
| 3,449,065 | 6/1969 | Kremer | 23/22 |
| 3,703,208 | 11/1972 | Heckman et al. | 166/247 |
| 3,896,045 | 7/1975 | Peeters et al. | 252/301.1 W |
| 4,054,320 | 10/1977 | Learmont | 299/4 |
| 4,636,367 | 1/1987 | Huck et al. | 423/12 |
| 4,664,809 | 5/1987 | Fenton et al. | 210/663 |
| 4,720,422 | 1/1988 | Higuchi et al. | 210/502.1 |
| 4,804,498 | 2/1989 | Mizuno et al. | 252/628 |
| 5,196,124 | 3/1993 | Connor et al. | 210/679 |
| 5,324,433 | 6/1994 | Grant et al. | 210/747 |

FOREIGN PATENT DOCUMENTS

| | | |
|---|---|---|
| 27389/92 | 4/1993 | Australia. |
| 20610/92 | 12/1993 | Australia. |
| 26931/92 | 1/1995 | Australia. |
| 24656/92 | 5/1995 | Australia. |

OTHER PUBLICATIONS

Deepak Garg, et al., "Removal of Radium From Water by Adsorption Onto Barium Sulfate Impregnated and Plain Activated Alumina", Cooperative Research Agreement Number CR-813148, Office of Research & Development, U.S. EPA (Feb. 24, 1992) pp. 1–19.

S. Subramonian et al., "Evaluating Ion Exchange for Removing Radium From Groundwater," Research & Technology, pp. 61–70 (May 1990).

D. Clifford, "Radium Removal From Water Using Softeners and Point-of-Use Devices," Technical papers presented at Water Quality Assoc. Annual Convention, pp. 37–62 (Mar. 1989).

D. Clifford, "Removal of Radium from Drinking Water," Radon in Drinking Water, Chapter 16, pp. 225–247 (date unknown, edited by C.R. Cothern et al.).

D. Clifford, "Radon, Radium and Uranium in Drinking Water," pp. 234–238 (1990, edited by C.R. Cothern et al.).

Philip T. King, et al., Discussion of Irena Cech, et al., article "Radon Distribution in Domestic Water of Texas," Ground Water Journal, vol. 27, No. 3, pp. 403–407 (May–Jun. 1989).

D. Clifford et al., "Evaluating Various Absorbents and Membranes for Removing Radium From Groundwater", Research & Technology, pp. 94–104 (Jul. 1988).

V.L. Snoeyink et al., "Barium and Radium in Water Treatment Plant Wastes," EPA R&D Project Summary EPA/600/S2-85/006 (Mar. 1985).

R.J. Elsinger et al., "Radium-224 in Natural Waters Measured by γ-Ray Spectometry," Analytica Chimica Acta, 144 pp. 277–281 (1982).

J. Michel et al., "$^{228}$RA and $^{226}$RA in Drinking Water: A New Technique Using Gamma-Ray Spectroscopy and Results from South Carolina," Isotope Studies of Hydrologic Processes, Dept. of Geology Univ. So. Carolina, pp. 83–90 (no date).

Rama et al., "Mechanism of transport of U–Th series radioisotopes from solids into ground water," Geochimica et Cosmochimica Acta vol. 48, pp. 395–399 (1984).

P.T. King et al., "Ground water geochemistry of $^{228}$Ra and $^{226}$Ra, and $^{222}$Rn," Geochimica et Cosmochimica Acta, vol. 46, pp. 1173–1182 (1982).

(List continued on next page.)

*Primary Examiner*—Ivars Cintins
*Attorney, Agent, or Firm*—Christensen O'Connor Johnson & Kindness

[57] ABSTRACT

A method is provided for reducing the concentration of radioactive materials or other trace contaminants in fluids withdrawn from subterranean reservoirs and also fluids in reservoirs. The method involves deposition of sorbent solids including, but not limited to, fine ion exchange resins, within the reservoir matrix surrounding a production well to act as an in-situ filter for dissolved radionuclides or other contaminants present in reservoir pore waters. For this purpose, the sorbent solid is either a) precipitated within the reservoir matrix by the reaction of ions or molecules of two or more carrier solutions or b) directly introduced into the reservoir as a solid component of a solid-liquid slurry using high-pressure injection techniques. Thereafter, fluids in the reservoir that contact the sorbent solid and fluids produced by the well contain significantly lower concentrations of contaminants which are by the sorbent solids by means of ion exchange, adsorption, chelation, chemisorption, or coprecipitation.

29 Claims, No Drawings

OTHER PUBLICATIONS

J. Michel, "γ-Ray Spectrometry for Determination of Radium–228 and Radium–226 in Natural Waters," Anal. Chem. 53, pp. 1885–1889 (1981).

J.S. Nathwani et al., "Adsorption of $^{226}$Ra of Soils (I)," Chemosphere No. 5, pp. 285–291 (1979).

T.W. Healy et al., "The Effect of Crystal Structure on the Surface Properties of a Series of Manganese Dioxides," Jnl. of Colloid and Interface Science 21, pp. 435–444 (1966).

R.L. Valentine et al., "Removing Radium by Adding Pre-formed Hydrous Manganese Oxides," Research & Technology, pp. 66–71 (Feb. 1990).

V.L. Snoeyink et al., "Strong–Acid Ion Exchange for Removing Barium, Radium, and Hardness," Research & Technology pp. 66–72 (Aug. 1987).

N.A. Hahn Jr., "Disposal of Radium Removed From Drinking Water," Research & Technology pp. 71–78 (Jul. 1988).

J.P. Longtin, "Occurrence of Radon, Radium, and Uranium in Groundwater," Research & Technology, pp. 84–93 (Jul. 1988).

A.G. Myers et al. "Removing Barium and Radium Through Calcium Cation Exchange," Research & Technology, pp. 60–66 (no date).

ASTM Designation: D2434–68, "Standard Test Method for Permeability of Granular Soils" (Constant Head), pp. 285–289 (Reapproved 1974).

Rahul Patel et al., "Radium Removal From Water By Manganese Dioxide Adsorption and Diattomaceous Earth Filtration," 21 pages, Cooperative Research Agreement No. CR–813148, Submitted to Office of Research & Development, U.S. EPA (Oct. 18, 1991).

Deepak Garg et al., "Removal of Radium from Water by Adsorption onto Barium Sulfate Impregnated and Plain Activated Alumina," 19 pages, Cooperative Research Agreement No. CR–812148, Submitted to Office of Research & Development, U.S. EPA (Feb. 24, 1992).

METHODS FOR THE REMOVAL OF CONTAMINANTS FROM SUBTERRANEAN FLUIDS

RELATED APPLICATIONS

This application is a continuation of now abandoned application Ser. No. 08/257,110, filed Jun. 8, 1994, which is a continuation-in-part of U.S. Ser. No. 08/028,951 filed Mar. 10, 1993, now abandoned which is in turn a continuation-in-part of Ser. No. 07/866,341 filed Apr. 9, 1992, now U.S. Pat. No. 5,196,124.

BACKGROUND OF THE INVENTION

1. Field of the Invention

The invention relates to methods for reducing the concentration of certain contaminants in fluids withdrawn from subterranean reservoirs or "aquifers" by means of wells. More specifically, the methods immobilize the contaminants in the subterranean formations.

2. Description of the Prior Art

Naturally-occurring radioactive materials (NORM) are present at varying concentrations in groundwater produced from water supply wells, oil production wells, and gas production wells. In addition, radioactive materials have been artificially introduced into groundwater reservoirs due to leaching or spills associated with radioactive waste disposal, testing, and mining activities. Production of fluids containing such contaminants poses both health-related and environmental problems. The invention provides a new method of reducing the production of such radioactive materials from wells.

Radioactive materials contained in fluids produced from subterranean reservoirs can pose a significant risk to human health and the environment. Due to toxic and carcinogenic effects, strict health-based limits have been established for human exposure to radium, uranium, radon, and other naturally occurring radionuclides. However, within fluids produced from water, oil, or gas production wells, radioactive material concentrations significantly exceeding acceptable levels are not uncommon. In addition to human exposure, production of such radioactive fluids can contaminate distribution piping and equipment and the environment.

Various water treatment technologies have been shown capable of removing radionuclides from produced fluids; however, such treatment facilities invariably involve generation of a concentrated radioactive waste residue, presenting a significant waste management and disposal problem.

The following prior art patents are directed, generally, to the removal of dissolved contaminants from produced potable groundwater: U.S. Pat. No. 3,136,715; U.S. Pat. No. 3,449,065; U.S. Pat. No. 3,803,208; U.S. Pat. No. 3,896,045; U.S. Pat. No. 4,054,320; U.S. Pat. No. 4,636,367; U.S. Patent No. 4,664,809; U.S. Patent No. 4,804,498.

U.S. Pat. No. 4,664,809, entitled "Groundwater Pollution Abatement" is directed to a method for pollution abatement in groundwater whereby a series of wells are drilled in the downstream path of the advancing front of contaminants in an aquifer. A particulate absorbent material, such as activated carbon, treated clay, inorganic oxides, silicates, alumina silicates, carbonaceous materials, organic-polymers, and the like is introduced through the wells. These methods are not, however, adequate for removal of radioactive materials from such aquifers and do not address treatment of production wells. Furthermore, the method of Pat. No. 4,664,809 specifically calls for placement of particulate sorbent materials downgradient of the contaminated groundwater zone, whereas the invention method involves i) placement of sorbent solids directly within the contaminant zone and ii) subsequent immobilization of dissolved contaminants by means of either active pumping or passive contact.

U.S. Pat. No. 4,054,320, entitled "Method for the Removal of Radioactive Waste During In-Situ Leaching of Uranium" is directed to a leaching process in mining operations wherein a "pre-pack" of sand or other particulate matter is placed around the exterior of the wellscreen of the well through which the leaching water is produced. The sand, or other particulate matter comprising the pre-pack, has deposited thereon a barium-containing ion exchange material designed to extract and concentrate the dissolved uranium contained in the produced waters.

The '320 patent's method may reduce the radionuclide content of produced waters to some degree but poses significant disadvantages relative to the present invention. First, due to the limited sorbent mass provided by the sand "pre-pack", the sorbent capacity of this medium would be consumed in a relatively short period, requiring redrilling of the well and replacement and disposal of the "pre-pack" material. Secondly, the "pre-pack" provides a relatively small surface area for contact with produced fluids. Therefore, radionuclide removal efficiencies would be less than those achieved by a larger in-situ zone that filters out or traps radionuclides in place. Finally, this prior method is intended for use in extraction of uranium ions from leaching fluids used in uranium mining operations, whereas the invention is directed to removing lower levels of radionuclides of concern from water supply wells, oil production wells, or gas production wells.

What is yet needed are methods for treating produced fluids for the removal of radionuclides, including radium, strontium, cesium, and uranium, that are simple, relatively inexpensive, and do not generate a radioactive waste product that poses disposal problems.

SUMMARY OF THE INVENTION

The present invention provides methods for removing or significantly reducing the concentration of radioactive materials and certain specific contaminants in subterranean reservoir fluids prior to entry of the fluids into a production well. The invention methods immobilize these contaminants in the sense that they retain these contaminants within the subsurface by means of an in-situ contaminant "filter" or "trap" of a particular composition that is deposited within the reservoir matrix surrounding the well. Consequently, the contaminant material concentrations in the reservoir fluids are significantly reduced, providing significant benefits in terms of reduced risk of human exposure or environmental contamination. Specifically, for water supply wells, subsurface removal of radionuclides provides a useable water resource while avoiding the problem of radioactive waste generation commonly associated with water treatment technologies. For oil and gas production wells, the present invention provides a means for reducing radioactive scale formation on distribution piping and equipment and for mitigating environmental contamination associated with brine storage and disposal. In addition, the rate of radon gas emanation from produced waters is reduced due to the reduced concentration of dissolved radium present in the production fluid. For reservoirs not presently under production but found to contain dissolved radionuclide contamination, the method can be employed to immobilize radionuclides within the subsurface, thereby preventing further spread of contaminants within the subsurface flow regime.

Conceptually, the invention is directed to the in-situ treatment of subterranean fluids for the removal of trace contaminants. This may be achieved either by actively pumping or drawing fluid through sorbent solids placed in the contaminated reservoir zone or by merely placing the sorbent solids in the contaminated zone so that contact with fluids immobilizes the contaminants. The techniques described herein may be utilized, using different solid sorbents or "scavenging chemical reactants," to remove trace contaminants other than radionuclides (the "specific contaminants" listed herein) from subterranean fluids by an in-situ treatment process which involves placing the solid sorbent in the subterranean reservoir for removal of contaminants. U.S. Pat. No. 5,196,124 also describes methods for removal of radioactive contaminants and other contaminants, and is hereby fully incorporated by reference. The "other specific contaminants," besides radionuclides, which are removed by the methods of the invention include arsenates, barium, fluoride, and selenite.

To remove radionuclides and other specific contaminants, the present invention provides in one embodiment for the placement of a finely ground ion exchange resin within the reservoir matrix to act as an "in-situ filter" for dissolved radionuclides present in the reservoir (or aquifer) fluids. For this purpose, the fine resin is directly introduced into the reservoir as a solid phase component of a solid-liquid slurry using high-pressure injection techniques.

According to the invention, fine ion exchange resin is directly introduced into the reservoir matrix as a solid component of a slurry. To achieve this, the resin is mixed with an appropriate injection fluid, and subsequently introduced into the reservoir via the production well itself or one or more injection wells, using conventional high-pressure injection, gravel packing, or "hydraulic fracturing" techniques. The particulate solids with which the resin is mixed include sand, proppants, glass beads, ceramic beads, and the like that are commonly used in gravel-packing and hydraulic fracturing operations to prop open subterranean fractures. Following such treatment, excess injection fluid is removed from the reservoir. However, the injected fine resin remains in place, to serve as an in-situ filter or trap for dissolved radionuclides contained in reservoir fluids flowing toward the production well. This filtration or trapping effect is largely due to ion exchange but other forces may also play a role in contaminant removal.

The fine ion exchange resin particles (10–200 μsize) may also be added or affixed to particulate solids such as proppants (sand, ceramic beads, glass beads, resin-coated sand, resin beads, etc) and then injected into the reservoir via a production well using techniques such as gravel packing, hydraulic fracturing or frac-packing.

The finely ground ion exchange resin can also be placed around the wellbore using well gravel-packing procedures. In this method, the sorbent solid is mixed with the gravel-pack material and subsequently the mixture is placed within and around the perforated or screened sections of the well using conventional inside-casing or open borehole placement techniques. Thus, as fluid is drawn from the well bore it passes through the resin which then immobilizes contaminants and reduces the concentration of contaminants in fluid brought to the surface.

In another embodiment, a carrier solution, containing a dissolved component of a sorbent material, is introduced into the reservoir zone surrounding the production well via the production well itself or one or more injection wells. An adequate volume of carrier solution is introduced to ensure contact of the carrier solution with reservoir matrix solids over a predetermined area. Thereafter, the second (and subsequent) carrier solution(s) is (are) introduced, containing appropriate dissolved components to cause precipitation of the sorbent solid within the reservoir matrix. Following such precipitation, excess carrier fluids are removed from the reservoir. The precipitated sorbent solids remain in place in the reservoir matrix to serve as an in-situ filter or trap for dissolved radionuclides contained in the reservoir fluids flowing into the production well. This filtration or trapping effect is due to ion exchange, adsorption, chelation, chemisorption, or coprecipitation of the radionuclides onto the precipitated sorbent solid. Likewise, by selecting suitable dissolved components in carrier solutions, sorbent solids may be placed in a subterranean reservoir to trap arsenates, barium, fluorides, or selenites, as desired and necessary.

The placement of the sorbent solid in the reservoir by injection may be used to reduce radionuclide, arsenate, barium, fluoride, or selenite, concentrations in reservoir fluids produced by subterranean wells. Alternatively, the method may be employed to immobilize dissolved radionuclides or other specified contaminants in reservoirs or portions of reservoirs not presently under production but found to contain contaminated fluids. In such case, wells are located directly within the zone of contaminated fluid and used to place sorbent solids by means of in-situ precipitation (second embodiment) or direct injection (first embodiment). In-situ immobilization of dissolved radionuclides or other specified contaminants can thereafter be effected by either 1) actively pumping reservoir fluids from the wells, causing reservoir fluids to contact the in-situ filter zone and/or 2) in the absence of pumping, allowing the reservoir fluids to contact the in-situ filter zone under the influence of natural fluid flow gradients within the reservoir.

The invention is applicable to a broad variety of reservoir conditions and well operating schemes. Within oil or gas production reservoirs containing complex, highly reducing aqueous solutions, direct injection of the fine ion exchange resin using hydraulic fracturing or gravel-packing techniques provides practical advantages. At a given well site, the chemical composition, concentration, and dimension of the ion-change in-situ filter or trap can be adjusted to achieve trace contaminant removal for an extended time period. Following eventual saturation of the resin with radionuclides or other contaminants, the in-situ contaminant filter can be reconstituted by repeating the process of the invention.

DESCRIPTION OF THE PREFERRED EMBODIMENTS

1. General Method and Applicability The invention provides a means of reducing the concentration of radioactive materials and other specified contaminants in fluids produced from subterranean reservoirs (or "aquifers") by means of production wells. Naturally-occurring radioactive materials (NORM) have been found to be present at concentrations exceeding health-based standards in groundwater produced by water supply wells, oil production wells, and gas production wells. In addition, radioactive materials have been artificially introduced into groundwater reservoirs due to leaching or spills associated with radioactive waste disposal, testing, and mining activities, resulting in contamination of drinking water resources. Further, in certain areas groundwater has been contaminated by unacceptably high levels of arsenate, barium, fluoride or selenite. To address these problems, the invention involves placement of sorbent solids within the reservoir matrix to act as an "in-situ filter or trap"

for dissolved radionuclides or other contaminants present in the reservoir fluids. Radionuclides or the other specific contaminants flowing past the in-situ filter are removed by means of ion exchange and other physical-chemical processes.

In the specification and claims, the term "finely ground ion exchange resin" comprehends a solid resinous material, preferably in the size range about 10 to about 200 μm, that effects the removal of dissolved radionuclides or other dissolved contaminants from reservoir fluids principally by ion exchange. Among the preferred ion exchange resins useful in the method of the invention are those that have magnetic-absorbent properties to allow them to attach to subterranean soil particles while acting as in situ filters of subterranean fluids. Also, the term "sorbent solid" means a solid material that is able to remove radionuclides or other specific contaminants from a subterranean fluid by any of a variety of physical or chemical processes including, but not limited to ion exchange, adsorption, chelation, chemisorption, coprecipitation, etc. Further, the sorbent solid is a material capable of direct injection into a reservoir either in carrier fluids each carrying separate components (e.g., one fluid carries cations, the other anions), or as a stable solid in a solid-liquid slurry, or in a form where it is chemically or physically bound to proppant or gravel pack material that is placed in the reservoir.

Sorbent solids that may be employed for removal of dissolved radionuclides and other specific contaminants include, but are not limited to, manganese dioxide, barium sulfate, barium carbonate, iron oxide, iron hydroxide, aluminum hydroxide, magnetic and non-magnetic ion-exchange resins, carbonaceous adsorbents, functionalized and non-functionalized polymeric adsorbents, zeolites, and activated carbon, as well as phosphates of zirconium and calcium, and oxides of zirconium, titanium, antimony, and tin.

The sorbent solid deposited within the reservoir matrix surrounding a given well may be composed of one or more such compounds, as required to remove the principal radionuclides present within the local reservoir fluids. These same sorbent solids may be employed for removal of other specified non-radioactive contaminants, such as use of manganese dioxide for removal of dissolved barium and use of either iron (III) hydroxide or aluminum (III) hydroxide for removal of dissolved arsenate, fluoride, or selenite from reservoir fluids.

Contrary to expectation, it has now been found that for optimal removal of radioactive contaminants from subterranean fluids in-situ, ion exchange resins must be fine, i.e., preferably have a particle size in the range from about 10 to about 200 microns (104 meters). This size is significantly smaller than typical soil particles at depths where treatment is to be effected. Since pressure drop is higher when fluid flows through a mass of smaller particles (smaller flow paths) relative to the pressure drop when flow is through larger particles, one might expect that using fine resin particles would be counterproductive. Instead, the fine resin particles, usually obtained by grinding resin beads, provide superior performance on a mass-by-mass comparison with typical commercial ion exchange resin beads.

2. Direct Injection of Sorbent Solid

In certain methods of placing the fine ion exchange resins in the underground structure, it may be desirable to hydraulically fracture the subterranean structure before ordering resin injection. The hydraulic fracturing process involves application of an injection pressure sufficient to enhance the secondary porosity features (e.g., fractures, fissures, partings, etc.) of the reservoir matrix surrounding the well. This pressure is supplied by injection of a fraccing fluid that contains, among other components, fine ion exchange resin and proppants. Injected proppant solids partially infill the induced fractures, serving to maintain an enhanced secondary porosity within the reservoir matrix following relief of injection pressures. In the method of the invention, sufficient injection pressure is applied and an adequate volume of the fraccing fluid slurry introduced so as to permeate the desired portion of the reservoir matrix surrounding the production well.

Following fracture treatment, excess injected fluid is removed from the reservoir; however, the fine ion exchange resin remains in place within the induced fracture zone, comprising an in-situ filter or trap for dissolved radionuclides contained in reservoir fluids flowing toward the well. This treatment cycle may be repeated as needed to establish the desired mass and distribution of the fine ion exchange resin within the reservoir matrix or extend the functional life of the in-situ filter.

Direct injection of the fine ion exchange resin can also be achieved using well gravel-packing procedures. For this purpose, the resin is intermixed with, or chemically or physically bonded to appropriate gravel-pack materials, and the prepared solids subsequently combined with a gravel-packing fluid in appropriate proportions to provide a slurry suitable for gravel-pack placement within and around the perforated or screened section of the well using conventional inside-casing or open borehole placement techniques.

3. Characteristics of Sorbent Solids

Fine ion exchange resins in this invention may be any resin or combination of resins that serve as an efficient scavenger for dissolved radionuclides or other specific contaminants, primarily by ion exchange. The resin must be capable of direct injection into a subterranean environment, either as a stable solid component of a solid-liquid slurry or in a form wherein it is chemically attached to the surface of proppant or gravel-pack material to functionalize the surface of that material for contaminant removal.

Ion exchange resins that may be employed for removal of dissolved radionuclides include, but are not limited to organic polymers that are macroporous, highly crosslinked resins, such as certain polystyrene resins. The resins are finely ground and impregnated with functional groups that will immobilize radionuclides or the other specific contaminants. These functional groups include sulfonate or carboxylate functional groups, or pure $BaSO_4$ crystals (for radium removal), or quaternary amine groups for uranium removal. Magnetic ion exchange resins that incorporate a magnetic material, such as iron oxide, into their structure are a preferred resin species because they provide an additional advantage: improved resin retention in the subterranean injection zone due to attraction between resin and surrounding sand matrix by magnetic attraction, or other phenomena. Resins may desirably contain functional groups that exhibit a high affinity for the dissolved radioactive or other specific contaminants and also other functional groups that allow the resin to be bonded to the surface of sand, proppant or gravel pack particulates (e.g., sand, and the like) for injection into a reservoir. Examples of ion exchange groups capable of removing radionuclides or other specific contaminants include sulfonic acid, carboxylic acid, tertiary amines, polyamines, quaternary amines, and the like. The resin deposited within the reservoir matrix surrounding a given production well may be composed of one or more such compounds, as required, to remove the principal contaminant present within the local reservoir fluids.

In general, given the trace-level mass concentrations of dissolved radionuclides or other specific contaminants commonly present in reservoir fluid, a relatively small mass of resin particles dispersed within the reservoir matrix will suffice to achieve a significant reduction in the concentration of radioactive materials or other trace contaminants in fluids flowing through the treated reservoir zone. The composition of solid-liquid slurries used to inject the fine grained ion exchange resin solids must be established on a case-by-case basis to deposit an appropriate mass of resin within the reservoir matrix, as may be determined by persons of ordinary skill in the art.

4. Characteristics of Injection Fluid

The fluid used for solid-liquid injection slurries may be any liquid which facilitates the deposition of the finely ground ion exchange resin within the reservoir matrix without adversely affecting fluids to be produced from the well. Most commonly, fresh water, saline water, or brines available at the site of the production well will be employed for this purpose. The injection fluid may be augmented with various additives serving to enhance the hydraulic fracturing or gravel-packing processes.

5. Relevant Reservoir Properties

The optimal procedure for deposition of the finely ground ion exchange resin within the reservoir will depend upon the chemical and physical characteristics of the reservoir pore fluids and solid matrix. Within oil or gas production reservoirs containing complex, highly reducing aqueous solutions and/or multiphase fluids, direct injection of the resin using hydraulic fracturing techniques can provide practical advantages in terms of the distribution and stability of the resin within the reservoir matrix.

Subterranean reservoirs or "aquifers" exploited for production of water, oil, or gas often consist of sand or sandstone deposits with sufficient effective porosity to store and transmit fluids or gasses. In such reservoirs, the reservoir solid matrix is composed primarily of silica sand particles intermixed with varying concentrations of silt, clay, and other minerals. The finely ground ion exchange resin deposited within such reservoirs are most likely retained by adsorption to the clay mineral fraction of reservoir matrix, as well as direct adsorption to the surface of the sand particles. In reservoirs consisting of fractured granite, basalt, dolomite, limestone, or other rocks, there is adsorption of the resin onto the rock surface or onto minerals previously deposited within the fracture network.

Resin particles introduced by means of direct injection are retained within the existing and induced fracture network of such reservoirs as a component of the solid proppant media deposited during the hydraulic fracturing process. Resin particles placed as a component of gravel pack materials occupy the space within or immediately surrounding the perforated or screened portion of the well casing.

It is important to note that, due to the low mass concentrations of radionuclides and other specific contaminants commonly present in reservoir pore fluids and the high sorbent capacity of the selected fine ion exchange resin in-situ filter materials, a relatively small mass of resin dispersed within the reservoir pore space will suffice to achieve a significant reduction in the radionuclide content of fluids flowing through the treated reservoir zone.

6. In Situ Precipitation

The above described methods using ion exchange resins may be suitably adapted and used for the placement of solid sorbent solids within a reservoir. However, sorbent solids may also be placed by another method, using carrier fluids, described in our U.S. Pat. No. 5,196,124 that is fully incorporated by reference herein. Briefly, carrier solutions must be devised to segregate two or more water-soluble components of the sorbent compound, which, upon mixing, precipitate the sorbent solid compound. Such solutions can be readily devised by persons of ordinary skill in the art. Carrier solutions which have been demonstrated for this purpose include: barium chloride and sodium sulfate solutions for precipitation of barium sulfate; or potassium permanganate and manganese sulfate solutions for precipitation of manganese dioxide. Acidic solutions of aluminum (III) chloride or aluminum (III) sulfate can be contacted by alkaline solutions of sodium, potassium, or calcium hydroxide for precipitation of aluminum (III) hydroxide. Similarly, acidic solutions of iron (III) chloride or iron (III) sulfate can be contacted by alkaline solutions of sodium, potassium, or calcium hydroxide for precipitation of iron (III) hydroxide.

Sorbent solids may be grafted onto gravel packing material by a process that includes the steps of: (1) activating surfaces of the gravel-pack material; and (2) bonding a coupling agent to the activated gravel-pack surfaces; and (3) grafting the sorbent solid to the coupling agent and thereby to the gravel-pack material, so that the functional group of the sorbent solid is exposed to reservoir fluids when the sorbent is injected into the reservoir.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications which can be made without departing from the spirit of the invention as described above are within the scope of the invention claimed herebelow.

What is claimed:

1. A method for reducing dissolved trace contaminant content of fluids withdrawn from subterranean reservoirs, said method comprising:
   (a) injecting into a reservoir through a well extending into a subterranean reservoir a quantity of particulate sorbent solid material sufficient to surround the well, the material capable of removing trace contaminants selected from the group consisting of radionuclides, arsenates, fluorides, selenites and barium, from reservoir fluids;
   (b) pressuring the injected sorbent solid material to distribute the material in subterranean fractures over a predetermined area surrounding the injection point;
   (c) contacting the injected solid particulate material with fluids to be withdrawn from the reservoir zone containing dissolved trace contaminants to remove the dissolved trace contaminants from the fluids; and
   (d) withdrawing fluids with substantially reduced trace contaminant content from the reservoir through the well.

2. The method of claim 1, wherein the sorbent solid comprises a functional group capable of removing trace contaminants, and the sorbent solid is grafted to gravel-packing material by a process comprising the steps of: activating surfaces of the gravel-pack material; bonding a coupling agent to the activated gravel-pack surfaces; and grafting the sorbent solid to the couplingagent on the gravel-pack material so that the functional group is exposed to reservoir fluids when the sorbent solid is injected into the reservoir.

3. The method of claim 2, wherein the trace contaminant is a dissolved radionuclide.

4. A method of reducing trace contaminant content of fluids while producing the fluids from contaminated zones of subterranean reservoirs, the method comprising:

(a) introducing into a contaminated zone of a subterranean reservoir surrounding a well extending into the zone, a sorbent solid for dissolved trace contaminants of fluids in the contaminated zone;

(b) contacting the fluids of the contaminated zone with the sorbent solid by drawing the fluids toward the well through the sorbent solids surrounding the well; and (c) producing contacted fluids with reduced contaminant concentration from the contaminated zone through the well.

5. The method of claim 4, wherein the trace contaminant is selected from the group consisting of radionuclides, barium, arsenates, fluorides, and selenites.

6. The method of claim 5, wherein the contaminant is a radionuclide and the sorbent solid comprises an ion exchange resin.

7. The method of claim 6, wherein the ion exchange resin comprises a functional group selected from the sulfonyl, quaternary amine, and carboxylic acid groups.

8. The method of claim 6, wherein the ion exchange resin is in the form of a powder with particles in the size range from about 10 to about 200 µm.

9. The method of claim 6, wherein the ion exchange resin is magnetic.

10. The method of claim 5, wherein the sorbent solid is selected from the group consisting of iron (III) hydroxide, and aluminum (III) hydroxide when the contaminant is selected from the group consisting of arsenate, fluoride, selenite; and the sorbent solid is manganese dioxide when the contaminant is barium.

11. The method of claim 4, wherein the step of introducing the sorbent solid into the subterranean reservoir comprises:

(a) introducing a first carrier solution, comprising at least one ion as a dissolved component of a sorbent solid scavenger for trace contaminants found in the reservoir fluids, into the reservoir in the area surrounding the well, the quantity and concentration of the carrier solution being sufficient to ensure deposition of a mass of sorbent solid sufficient to reduce the dissolved trace contaminant content of withdrawn fluids, such that when the ions are precipitated from the carrier solution the ions are distributed over a predetermined area;

(b) introducing a second carrier solution, comprising at least one dissolved complementary ion of the solid sorbent for trace contaminants, into the reservoir area surrounding the well to commingle with at least one ion of the first carrier solution; and (c) reacting the at least one ion of the first carrier solution and the complementary ion of the second carrier solution to precipitate a solid sorbent able to remove trace contaminants, selected from the group consisting of radionuclides arsenates, barium, selenite and fluoride, from fluids in the reservoir, when the fluids contact the sorbent solid.

12. A method of reducing a concentration of radionuclides in fluids while producing the fluids from a subterranean reservoir, the method comprising:

(a) injecting fine ion exchange resin particles into a radionuclide contaminated zone of a reservoir surrounding a well in sufficient quantity to reduce dissolved radionuclide concentrations of fluids contacting the quantity of resin particles; and (b) producing fluids of reduced radionuclide concentration from the well by drawing reservoir fluids containing radionuclides in the contaminated zone into contact with the resin particles surrounding the well and fixing the radionuclides to the resin.

13. The method of claim 12, wherein the injecting comprises injecting ion exchange resin particles in the size range 10 to 200 µm.

14. The method of claim 13, wherein the ion exchange resins are functionalized with a functional group selected from the group consisting of sulfonyl, quaternary amine, and carboxyl groups.

15. The method of claim 13, wherein the ion exchange resin is magnetic.

16. The method of claim 12, wherein the ion exchange resins are functionalized with a functional group selected from the group consisting of sulfonyl, quaternary amine, and carboxyl groups.

17. The method of claim 12, wherein the ion exchange resin is magnetic.

18. A method of reducing concentration of radionuclides in fluids being produced from a radionuclide-contaminated subterranean reservoir, the method comprising:

(a) injecting ion exchange resin particles through a well into a radionuclide contaminated zone of said reservoir surrounding the well in sufficient quantity to reduce dissolved radionuclide concentrations of fluids drawn towards the well;

(b) drawing reservoir fluids, selected from the group consisting of water and hydrocarbons, containing radionuclides in the contaminated zone to the resin particles surrounding the well;

(c) immobilizing the radionuclides of the drawn reservoir fluids by fixing the radionuclides to the ion exchange resin particles; and (d) producing fluids with reduced concentrations of radionuclides through the well.

19. The method of claim 18, wherein the injecting comprises injecting ion exchange resin particles in the size range 10 to 200 µm.

20. The method of claim 19, wherein the ion exchange resins are functionalized with a functional group selected from the group consisting of sulfonyl, quaternary amine, and carboxyl groups.

21. The method of claim 19, wherein the ion exchange resin is magnetic.

22. The method of claim 18, wherein the ion exchange resins are functionalized with a functional group selected from the group consisting of sulfonyl, quaternary amine, and carboxyl groups.

23. The method of claim 18, wherein the reservoir contains water and the fluids in the contaminated zone contain water with dissolved radionuclides therein.

24. The method of claim 18, wherein the ion exchange resin is magnetic.

25. A method for reducing trace contaminant content of fluids withdrawn from subterranean reservoirs, the method comprising:

(a) introducing a first carrier solution, comprising at least one ion as a dissolved component of a sorbent solid for trace contaminants found in the reservoir fluids, into the reservoir through a well into an area surrounding the well, the quantity and concentration of the carrier solution being sufficient to precipitate a mass of sorbent solid around the well sufficient to reduce the dissolved trace contaminant content of withdrawn fluids;

(b) introducing a second carrier solution, comprising at least one dissolved complementary ion of the solid sorbent for trace contaminants, through the well into the reservoir area surrounding the well to commingle with the first carrier solution;

(c) reacting the at least one ion of the first carrier solution and the complementary ion of the second carrier solution to precipitate a solid sorbent able to remove trace contaminants in the area surrounding the well, said contaminants selected from the group consisting of radionuclides, arsenates, barium, selenite and fluoride, from fluids in the reservoir, when the fluids contact the sorbent solid;

(d) contacting the sorbent solid surrounding the well with fluids containing the dissolved trace contaminants in the reservoir to thereby immobilize the contaminants in the reservoir; and (e) producing fluid with substantially reduced levels of the contaminants from the reservoir through the well.

26. The method of claim 25, wherein the reservoir fluids are selected from the group consisting of fresh water, saline water, and hydrocarbons.

27. The method of claim 25, wherein the reservoir fluids comprise brine fluids in a geothermal reservoir.

28. The method of claim 25 wherein the introducing of carrier solutions is via a production well.

29. The method of claim 25, wherein the introducing of carrier solutions is through at least one injection well.

* * * * *